United States Patent [19]

Unglaube et al.

[11] 4,352,096
[45] Sep. 28, 1982

[54] DEVICE FOR PROVIDING A MODULO-N CHECK CHARACTER

[75] Inventors: Uwe Unglaube; Friedrich V. Miehe, both of Berlin, Fed. Rep. of Germany

[73] Assignee: Nixdorf Computer AG, Paderborn, Fed. Rep. of Germany

[21] Appl. No.: 81,217

[22] Filed: Oct. 2, 1979

[30] Foreign Application Priority Data

Oct. 2, 1978 [DE] Fed. Rep. of Germany ....... 2842905

[51] Int. Cl.³ .......................... G08C 9/06; G08B 5/00
[52] U.S. Cl. ................................ 340/815.06; 340/357; 200/25
[58] Field of Search ............... 340/378.3, 357; 200/18, 200/25

[56] References Cited

U.S. PATENT DOCUMENTS

| | | | |
|---|---|---|---|
| 2,689,343 | 9/1954 | Mackay | 340/357 |
| 2,758,297 | 8/1956 | Cones | 340/357 |
| 3,472,978 | 10/1969 | Granata | 340/357 |
| 3,496,312 | 2/1970 | Sallow | 200/25 |
| 3,761,649 | 9/1973 | Jedynak | 200/18 |
| 3,885,165 | 5/1975 | Franks | 200/25 |
| 4,015,253 | 3/1977 | Goldstein | 340/378.3 |

*Primary Examiner*—Harold I. Pitts
*Attorney, Agent, or Firm*—Krass, Young & Schivley

[57] ABSTRACT

Apparatus is disclosed for providing a modulo-n check character as a function of a sequence of data characters. The check character may be used to permit a check of the data character sequence for its correctness, for example, after being transmitted to a data processing installation or after printing. In the preferred embodiments each data character of the sequence is generated by one of a plurality of data character carriers which are selectively set to generate a given character. An additional check carrier is provided to generate the check character. The check carrier is set by a predetermined amount each time one of the data carriers is set so that the ultimately generated check character is a function of the data character sequence.

1 Claim, 5 Drawing Figures

DEVICE FOR PROVIDING A MODULO-N CHECK CHARACTER

BACKGROUND OF THE INVENTION

In data processing techniques, prior to its processing in a data processing installation, data must be acquired in suitable form of presentation on data carriers (data media), so that the data can be transmitted from the carriers to the data processing installation and fed into it. It is possible to acquire the data by machine or also visually. In this process, errors can appear due to various causes. Such causes, for example, are faulty data carriers (data media) or faulty data signals, functional defects or construction defects in the equipment (devices) used for data acquisition, errors in operation or also external interference effects such as, for instance, electromagnetic or optical interferences.

Especially in the case of manual data acquisition and data transmission with longer sequences of characters, errors can be caused by a mix-up of characters, omission of characters or feeding in one and the same character more than once. Furthermore, disturbances are possible due to poor legibility of received signals. Such cases frequently occur also when character sequences having been intended for data recognition by machine have been degraded in their legibility so that they must be acquired manually, i.e. visually.

In order to avoid errors of the above-described type within the scope of data acquisition and data transmission to the data processing installation, check characters are used which are acquired and/or transmitted simultaneously with a sequence of characters to permit a check of the sequence of characters for its correctness.

Frequently, modulo-n check characters are used which in the simplest case, for instance in the transmission of numerical sequences, identify the sum of digits or the complement of the sum of digits of the respective numerical sequence due to the fact that in each case, they show the difference between the sum of digits and the next lower or next higher integer multiple of the number n where n corresponds to the number of possible digits per digit position. In the case of the acquisition and transmission not of numerals, but of other character presentations, check characters can be similarly produced by assigning a numerical value to them.

Check characters can, of course, be relatively easily produced or generated with a data processing installation or also with electronic coding installations. In many cases, however, especially in the data acquisition, direct access to such installations is not possible. There are many applications in which access to sophisticated electronics equipment does not exist, for instance, in the use of simple devices to mark goods with prices and/or article identification numbers, in the case of stationary printing machines for the generation of data carriers whose characters are to be legible, in the case of decade switches (contactors) which are capable of being set to a certain definite sequence of numerals or also in the case of meters for electric current, gas or water consumption. Especially in the case of printing machines, in which character wheels are set by machine to the desired sequence of characters in each particular case, the functional reliability can be increased by a check character which is produced simultaneously with the respective data character sequence and printed jointly with it.

If, in these and similar cases, a check character is automatically produced simultaneously with the data acquisition, the data reliability can be increased and thereby the possibility of errors, also in the subsequent data transmission, can be considerably decreased and perhaps even eliminated.

SUMMARY OF THE INVENTION

It is an object of the present invention to disclose an arrangement for the presentation (display) and/or generation of a modulo-n check character which is provided automatically during the acquisition of a sequence of data characters according to a simple principle such that voluminous electronic auxiliary means or access to a data processing installation are not necessary.

For the solution of this task, an arrangement according to the invention is designed in such a way that an additional check character carrier is provided which is coupled to the setting device of the suitable data character carriers in such a way that each setting of one of these character carriers results in a setting of the additional check character carrier by a given or preset amount.

By means of the invention, the setting of every desired character position of the settable data character carriers which, for instance, takes place by means of a rotary motion, causes the additional check character carrier to always be set simultaneously by a given preset amount in each particular instance. Consequently, for each state of setting of the arrangement displaying or generating the data characters, the modulo-n complement or the modulo-n sum of digits of the particular data character sequence will be provided by the additional check character carrier, where n is the number of possible settings of each settable character carrier. In the case of a printing mechanism with, for instance, 12 different characters per character carrier position, for each setting of the character carriers a modulo-12 check character computation takes place and a check character is generated and displayed so that the correctness of the printed character sequence can be determined during subsequent processing by means of the simultaneously printed check character or test mark.

An improvement in the data reliability is possible if the given or preset amount the check character carrier is to be set varies for each character position.

In this manner, a weighting of the individual positions of the character sequence can be taken into consideration in the check character generation. If, in the simplest case, an alternate weighting of the individual character places is undertaken according to the valuation sequence of 1, 0, 1, 0 etc., then this means for the check character computation that the character positions weighted by 1 are included in the computation while the character places weighted by 0 are not taken into account. By means of this approach, protection against the transposition of adjacent characters can, for instance, be made possible. Other weightings are made possible by the corresponding change of the given or preset amount as has been described.

Examples of embodiments of the invention show simple arrangements for providing the display of character sequences. The invention can, however, also be applied in an analogous manner in arrangements for the generation of other character sequences, for instance, sequences of letters of the alphabet. For the sake of easier understanding, the arrangement to be described below works on a mechanical principle. In place of mechanical couplings between data character carriers and check character carriers, however, electrical connections which work in an analogous manner to a mechanical coupling such as relays, microcircuits, LCD displays controlled by microcircuits, light emitting diodes, light generated coders and decoders, and the like can also be provided in the form of electromechanical, electronic or electrooptical devices. Thus, the invention can be embodied within the scope of equivalent solutions based on well known mechanical and electrical principles.

BRIEF DESCRIPTION OF THE DRAWINGS

The subject matter of the invention is particularly pointed out and distinctly claimed in the concluding portion of this specification. The invention itself, however, both as to organization and method of operation together with further objects and advantages thereof may best be understood by reference to the following description taken in connection with the accompanying drawings in which:

DETAILED DESCRIPTION OF THE DRAWINGS

Figure 1:
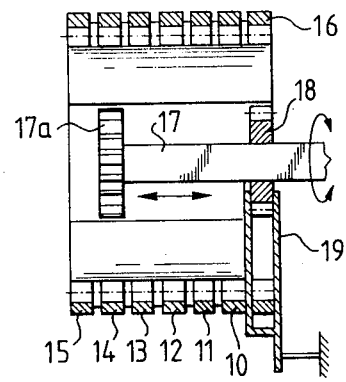
FIG. 1 illustrates a schematic presentation of a simple mechanical numerical mechanism with character carriers or wheels capable of being set individually and a check character carrier or wheel in a partial sectional side elevation.

FIG. 1 schematically shows an arrangement of character carriers or type wheels 10 to 16 which, for instance, can be provided with numerals to be printed and for this reason are designated as "numerical wheels" in the description which follows. These "numerical wheels" belong to a printing mechanism or can also be provided inside of a simple digital display arrangement which can be set via a shaft 17. This shaft 17 is fitted in a drive wheel 18 in a form-locking manner, but at the same time is slidably movable in its longitudinal direction. Drive wheel 18 is kept in its position in a laterally immovable manner by means of a locking device or stop 19 but can be turned by shaft 17. Shaft 17 furthermore carries a setting wheel 17a which can be moved by shaft 17 in such a manner that it may engage one of "numerical wheels" 10 to 15 to reset it by rotating the wheel until a desired character is in a given position. If shaft 17 is turned, one of the "numerical wheels" 10, 11, 12, 13, 14 or 15 is engaged by setting wheel 17a and thus also turns. Simultaneously, drive wheel 18, which is coupled to "numerical wheel" 16, turns as well. This "numerical wheel" 16 is a check character wheel which is provided for the display and/or generation of the respective check numeral.

Since, with each setting of one of the "numerical wheels" 10 to 15, a similar setting of check numeral wheel 16 takes place, it is possible in each case to generate a check numeral on this check character wheel 16 which corresponds to the modulo-n sum of digits or to the complement of the modulo-n sum of digits of the numerals displayed by "numerical wheels" 10 to 15 wherein n is the number of possible positions (settings) of these "numerical wheels" 10 to 15.

The following table shows examples of numerical sequences for n=12 and six "numerical wheels" as well as a check numral wheel. Each vertical column represents the characters on each wheel and their initial relationship with characters on adjacent wheels. Moving left to right, the first column represents data wheel 15, the second column data wheel 14; and so forth, with the last column labeled "check numeral" representing check character wheel 16. The table can be envisioned as the result of cutting and unrolling the string of characters on the circumference of each wheel and lying them flat on the paper.

| Check Numeral Corresponds To Modulo-12 Sum of Digits | | Check Numeral Corresponds To Complement of Modulo-12 Sum of Digits | |
|---|---|---|---|
| Numerical Sequence | Check Numeral | Numerical Sequence | Check Numeral |
| 7 2 5 1 4 8 | 3 | 7 2 5 1 4 8 | 9 |
| 8 3 6 2 5 9 | 4 | 8 3 6 2 5 9 | 8 |
| 9 4 7 3 6 A | 5 | 9 4 7 3 6 A | 7 |
| A 5 8 4 7 B | 6 | A 5 8 4 7 B | 6 |
| B 6 9 5 8 0 | 7 | B 6 9 5 8 0 | 5 |
| 0 7 A 6 9 1 | 8 | 0 7 A 6 9 1 | 4 |
| 1 8 B 7 A 2 | 9 | 1 8 B 7 A 2 | 3 |
| 2 9 0 8 B 3 | A | 2 9 0 8 B 3 | 2 |
| 3 A 1 9 0 4 | B | 3 A 1 9 0 4 | 1 |
| 4 B 2 A 1 5 | 0 | 4 B 2 A 1 5 | 0 |
| 5 0 3 B 2 6 | 1 | 5 0 3 B 2 6 | B |
| 6 1 4 0 3 7 | 2 | 6 1 4 0 3 7 | A |

$7 + 2 + 5 + 1 + 4 + 8 = 27$
(A). $27 - (2 \times 12) = 3$
(B). $(3 \times 12) - 27 = 9$ As set forth in equations A and B above, the calculation of the check numeral from the sum and complement of the digits of the numerical sequence is respectively given for the first numerical sequence of the table. In other words, the wheels are intially set to the positions indicated in the first line of the table in which the number 3 is the correct modulo-n check character for the given sequence of data characters. Subsequent rotation of one of the data wheels 10-15 will also result in movement of the check character wheel 16 so that the correct character will be provided for each possible sequence of the data characters. For example, if the last digit 8 was set to 9 by rotating wheel 10 one position then check character wheel 16 will similarly be rotated by one position to generate the character 4. The character 4 is the correct modulo-12 check character for the thus generated data sequence of $$7+2+5+1+4+9=28$$

wherein the modulo-12 check character is calculated by (C) $28-(2\times 12)=4$

If wheel 12 is next moved two positions to generate a 3, then check character wheel will likewise move two more positions to generate a 6 for the sequence:

$$7+2+5+3+4+9=30$$

in which the modulo-12 check character is derived from the following equation:

(D) $30-(2\times 12)=6$

It can thus be appreciated that the correct modulo-n check character will be provided for any subsequent settings of the data wheels 10–15 due to the unique coupling of the means for setting these wheels to the check character wheel 16 which is set a predetermined amount everytime one of the data wheels is set.

For the above described example of an embodiment of the present invention, a gear ratio of 1:1 is assumed for the rotary motions of "numerical wheels" 10 to 15 and of check numeral wheel 16. A different gear ratio can, however, also be appropriate or the gear ratio between the individual "numerical wheels" 10 to 15 can be changed if another type of check numeral computation is to be carried out. It is important for the implementation of the idea of the invention that the check numeral wheel 16 is constantly coupled to the setting mechanism for the "numerical wheels" 10 to 15 in such a manner that it joins in the execution of every rotary movement of one of "numerical wheels" 10 to 15. However, for instance in the sense of a weighting of the above described type, different gear ratios can be provided or, if the occasion arises, for a weighting with the value of zero, no rotation of the check numeral wheel 16 takes place.

It goes without saying that in the place of wheels as the character carriers, also magnetic tapes or character generating devices of a different type can be provided.

Figure 2:
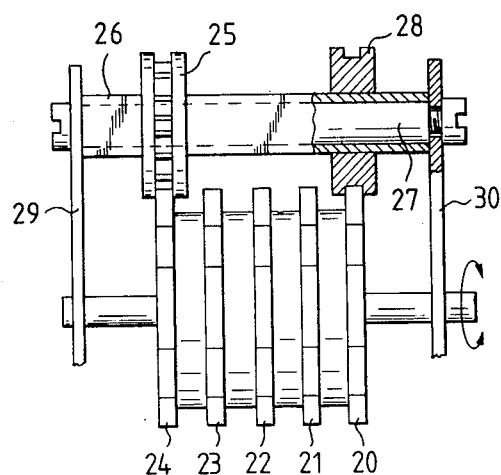
FIG. 2 shows an additional example of an embodiment of the invention in a numerical mechanism capable of being set from without or externally.

FIG. 2 shows a simple arrangement of character wheels 20 to 24 which can be set by contact at their outer circumference or periphery. A drive wheel 25 is rigidly connected to a hollow shaft 26 which is rotatably mounted about an axis 27. A setting wheel 28 is coupled to hollow shaft 26 in form-locking manner, but at the same time in a laterally movable manner. Shaft 26 is fastened to two swivel arms or levers 29 and 30 which, in a manner not shown, can be swivelled in such a way that drive wheel 25 and setting wheel 28 can be disengaged from character wheels 20 to 24. In this position, setting wheel 28 can then be slidably moved on shaft 26 adjacent to a selected character wheel 20 to 25 in such a way that when swivel arms 29 and 30 are swung back, it engages a selected one of character wheels 20 to 23 to which it has been coordinated in each particular case. In contrast thereto, drive wheel 25 remains arranged on shaft 26 in such a way that in every position of setting wheel 28, drive wheel 25 is always engaged with character wheel 24. If now one of character wheels 20 to 23 is set by means of setting wheel 28 engaged therewith, then character wheel 24 is also set at the same time by drive wheel 25 so that it can be utilized for the display or generation of a check character in the manner described.

Figure 3:
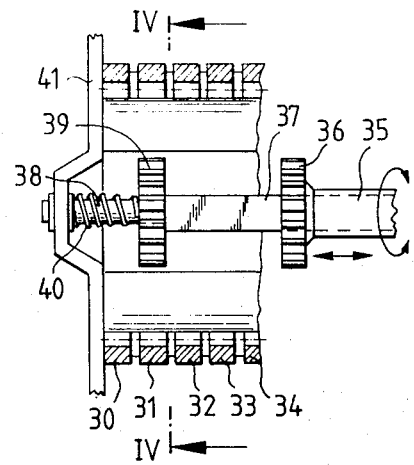
FIG. 3 illustrates a schematic, partial, sectional, side elevation of another numerical mechanism in which the check character carrier is arranged with the data character carriers on either side thereof and capable of being set individually.

FIG. 3 shows an additional possibility for the mechanical implementation of the principle of the invention in the case of character wheels wherein the check character wheel, however, can be arranged with the data character wheels on either side thereof instead of at the end of the row. Character wheels 30, 31, 32, 33 and 34 are shown and each can be set by means of the rotation of a hollow shaft 35. Hollow shaft 35 is rigidly connected to a setting wheel 36 and the combination is coupled to a shaft 37 in form-locking manner so that setting wheel 36 can be moved laterally on shaft 37 with movement of hollow shaft 35. Setting wheel 36 normally serves to set character wheels 32, 33 and 34 and can be made to engage the inner circumference of any one of these wheels individually. Shaft 37 is rigidly connected to a third shaft 38 which is coupled to a drive wheel 39 in form-locking manner and at the same time in a manner movable in its longitudinal direction.

If setting wheel 36 is made to engage one of the character wheels 32, 33 and 34, then the selected character wheel turns jointly with setting wheel 36, but via shaft 37, drive wheel 39 and check character wheel 31 also turn simultaneously. In this manner, check character wheel 31 follows each rotary motion of any one of character wheels 32, 33 and 34.

If character wheel 30 is also to be set, then setting wheel 36 is made to engage the inner circumference of check character wheel 31, while drive wheel 39, basically provided for this purpose, simultaneously is moved in such a way that it engages numeral or character wheel 30. In this manner, "numerical wheel" 30 and check character wheel 31 are turned simultaneously. If setting wheel 36 then is again moved to the right (FIG. 3), then a spring 40 again returns drive wheel 39 into its rest position shown in FIG. 3, in which it engages check character wheel 31. The spring 40 thus is arranged between drive wheel 39 and a lateral mounting support 41 which at the same time serves as a bearing support for shaft 38.

Figure 4:
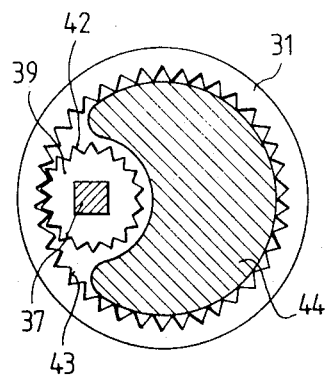
FIG. 4 illustrates the section along line 4—4 in FIG. 3.

FIG. 4 shows a cross section according to the direction of view 4—4 shown in FIG. 3. Shaft 37 is a square shaft and carries drive wheel 39. Hollow shaft 35 (FIG. 3) can be moved on shaft 37. The outer circumference periphery of drive wheel 39 is provided with teeth 42 which mesh with the internal teeth 43 on the inner circumference of check character wheel 31 so that the latter turns when drive wheel 39 turns. Furthermore, a carrier body 44 can be recognized which serves as a support for character wheels 30, 31, 32, 33 and 34, and is provided with a lateral recess, in which the setting mechanism for these character wheels is arranged.

Figure 5:
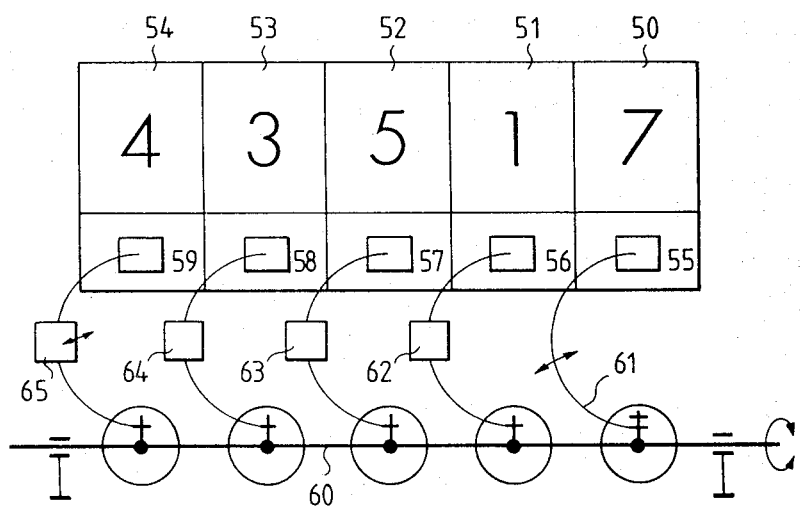
FIG. 5 illustrates an arrangement for the display and/or generation of a numerical sequence by means of decade switches (contactors) with associated, schematically represented mechanisms.

FIG. 5 shows an example of an embodiment of the invention for an arrangement of visual characters of decade switches (contactors) 50, 51, 52, 53 and 54 which respectively can be individually reset by means of pushbutton keys 55, 56, 57, 58 and 59 so that in each case the switch shows one of several numerals.

Below this visual character or decade switch arrangement, a rotatably mounted shaft 60 is shown schematically, and is provided with actuation levers 62, 63, 64 and 65. The latter are attached to shaft 60 in such a manner that on swivelling motion of these levers, they effect a rotation of shaft 60, but a rotary motion of shaft 60 does not result in a swivelling motion of levers 62, 63, 64 and 65.

An additional actuation lever 61 is fixedly connected to shaft 60, so that rotational movement of shaft 60 in every case results in a swivelling motion of this actuation lever 61.

If by means of one of the actuation levers 62, 63, 64 or 65 the respective associated decade switch 51, 52, 53 or 54 is now actuated, then shaft 6 is rotated and thereby actuation lever 61 is swivelled or actuated so that decade switch 50 is actuated simultaneously. With each actuation of a pushbutton or key 56, 57, 58 or 59, pushbutton or key 55 thereby is also actuated, so that decade switch 50 can be used as a check character switch. With the corresponding correlation of the initial positions (settings) of all of the decade switches, check character switch 50 then always indicates the modulo-10 sum of digits of the indicated sequence of numerals.

In the example of embodiment of the invention shown in FIG. 5 as well, a weighting, for instance with the value sequence of 1, 0, 1, 0 . . . , can very easily be implemented by means of the expedient that in the case of the numerical places weighted with 0, the actuation levers 62 to 65 are not coupled to shaft 60 and their actuation is not translated into a corresponding rotary motion of the shaft 60.

The invention can also be implemented in the case of decade counting mechanisms whose individual character carriers, instead of being actuated individually, can in each case be actuated on the occurrence of a "carry" or overflow. If a check character carrier is provided in a counting mechanism of this kind, then the former must be reset by a predetermined amount each time when one of the character carriers is reset and, in addition, it must again be reset by a predetermined amount when a "carry" occurs so that the number of changed positions also enters into the check numeral computation. In case of need, several check numeral carriers can also be provided for this purpose, the control of which can also take place electrically so that a practically delay-free joint resetting of the check numeral carrier takes place. This is also true in the case of several "carries" or overflows.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for mechanically generating a modulo-n check character, said device comprising:
   a group of rotatable data character wheels, each wheel having a plurality of characters on its outer circumference, said character wheels being initially arranged so as to present a given sequence of data characters, one character from each wheel;
   a rotatable check character wheel having a plurality of characters on its outer circumference, said check character wheel being initially arranged to provide a modulo-n check character for the initially presented sequence of data characters;
   a rotatable shaft adapted to slide in a longitudinal direction relative to said wheels;
   a setting wheel mounted on the shaft inside said wheels, operative to engage one of the data wheels and upon rotation of the shaft to rotate the engaged wheel to produce a different data character in the presented sequence; and
   a drive wheel in fixed relationship with the check character wheel and slideably mounted on said shaft, adapted upon rotation of the shaft to rotate said check character wheel a predetermined amount every time one of the data wheels is rotated thereby continuously providing a modulo-n check character for each different presented sequence of data characters.

* * * * *